(12) United States Patent
Cunningham et al.

(10) Patent No.: US 6,942,749 B2
(45) Date of Patent: Sep. 13, 2005

(54) METHOD OF MANUFACTURING A SECURITY ITEM

(75) Inventors: Karen Cunningham, Bucks (GB); Jonathan Brian Marx, Middlesex (GB)

(73) Assignee: De La Rue International Limited, Hampshire (GB)

( * ) Notice: Subject to any disclaimer, the term of this patent is extended or adjusted under 35 U.S.C. 154(b) by 181 days.

(21) Appl. No.: 10/140,333

(22) Filed: May 8, 2002

(65) Prior Publication Data

US 2002/0166624 A1 Nov. 14, 2002

(30) Foreign Application Priority Data

May 10, 2001 (GB) .............................. 0111452

(51) Int. Cl.[7] .............................................. B42D 15/10
(52) U.S. Cl. ................. 156/242; 264/167; 264/171.13; 264/171.23; 264/171.21; 264/271.1; 264/275
(58) Field of Search ................. 162/140, 103; 264/167, 171.13, 171.23; 425/113, 223, 224, 456

(56) References Cited

U.S. PATENT DOCUMENTS

| | | | |
|---|---|---|---|
| 4,039,248 A | * | 8/1977 | Franke et al. ............... 385/111 |
| 4,400,338 A | | 8/1983 | Rundo |
| 4,462,866 A | * | 7/1984 | Tooth et al. ................. 162/103 |
| 4,943,093 A | * | 7/1990 | Melling et al. ............... 283/83 |
| 5,405,500 A | * | 4/1995 | Knight ....................... 162/103 |
| 5,419,424 A | | 5/1995 | Harbaugh |
| 5,424,119 A | * | 6/1995 | Phillips et al. .............. 428/328 |
| 5,876,068 A | | 3/1999 | Schneider et al. |
| 5,903,340 A | * | 5/1999 | Lawandy et al. ............. 356/71 |
| 6,164,548 A | * | 12/2000 | Curiel ........................ 235/487 |

FOREIGN PATENT DOCUMENTS

| | | |
|---|---|---|
| EP | 0 536 855 A2 | 4/1993 |
| EP | 0 778 159 A1 | 6/1997 |
| GB | 1 548 588 | 7/1979 |
| WO | WO 99/46133 | 9/1999 |

* cited by examiner

*Primary Examiner*—Sam Chuan Yao
*Assistant Examiner*—Barbara J. Musser
(74) *Attorney, Agent, or Firm*—Oliff & Berridge, PLC

(57) ABSTRACT

A method of manufacturing a security item comprises extruding or casting a polymer plastics substrate and, during the forming process, introducing a security thread into the substrate. The security thread is embedded to different depths in the substrate so as to generate a windowed effect.

15 Claims, 7 Drawing Sheets

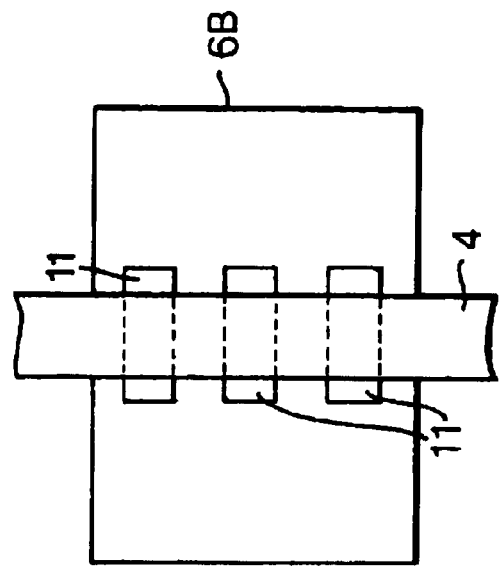
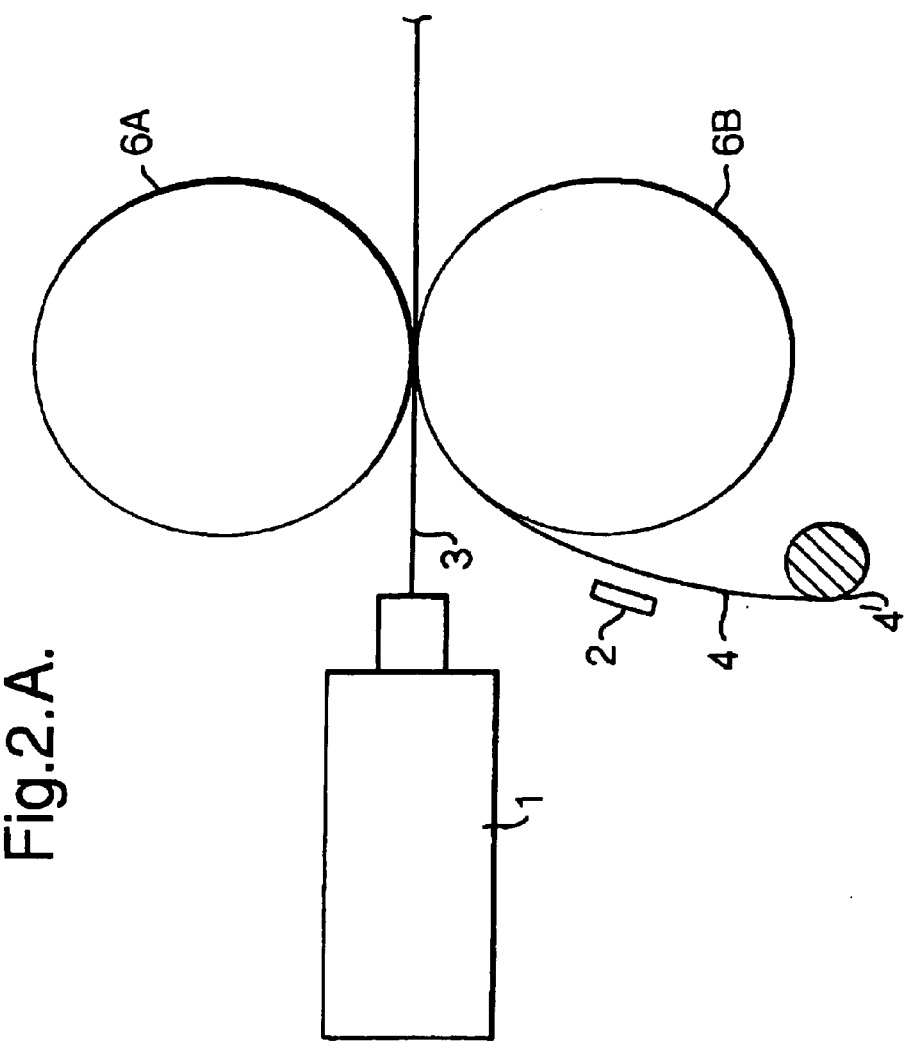

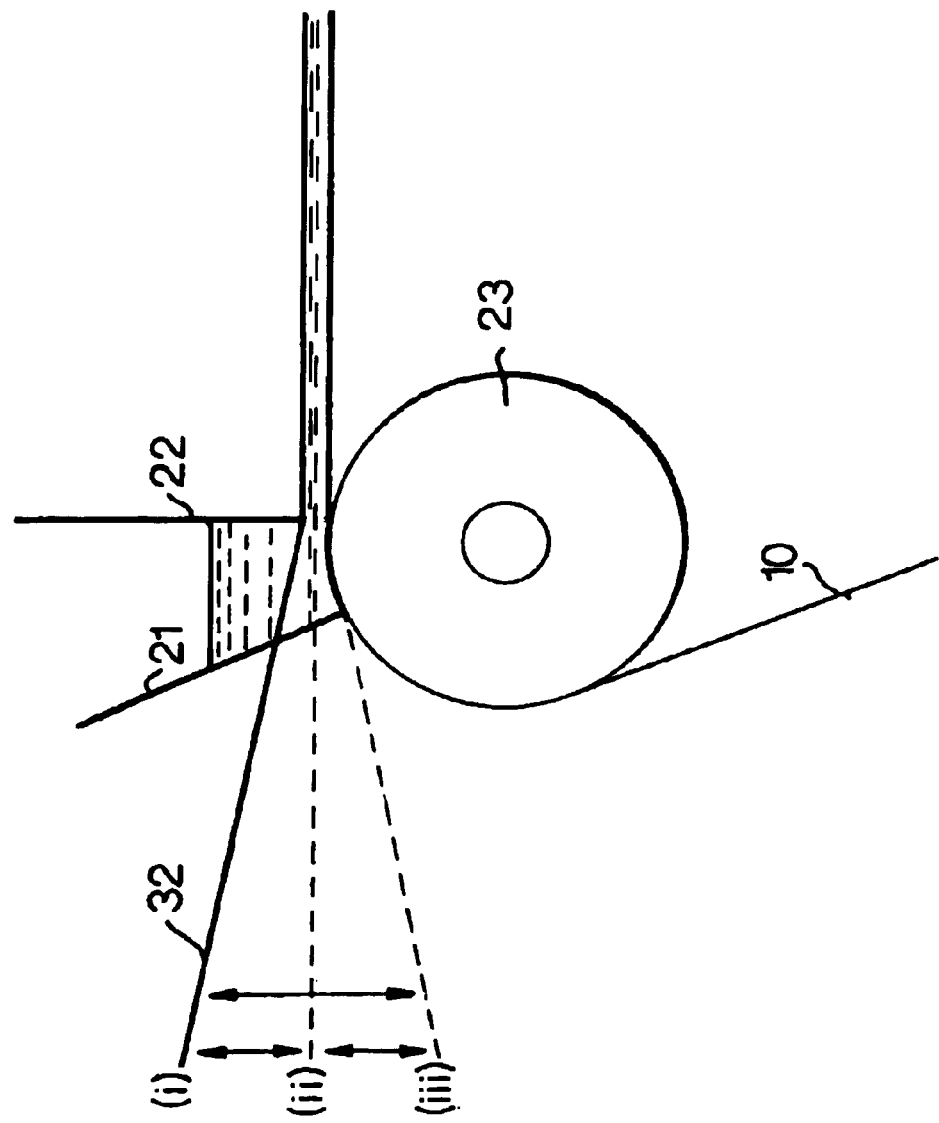

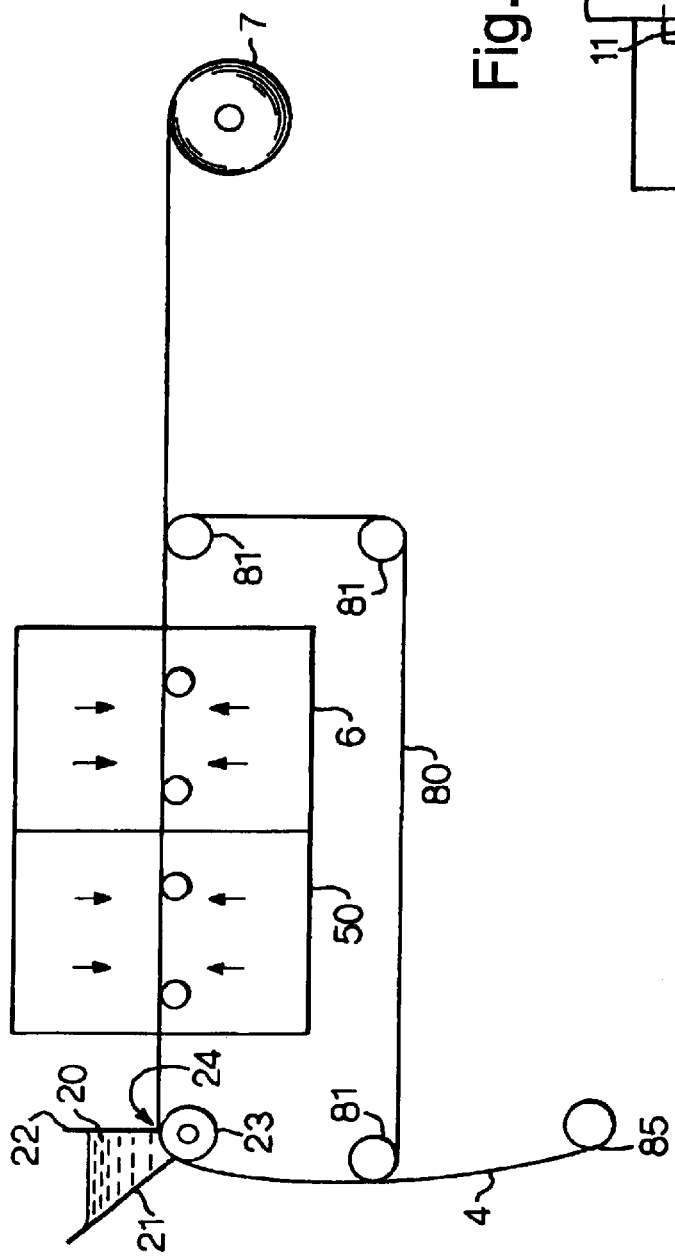
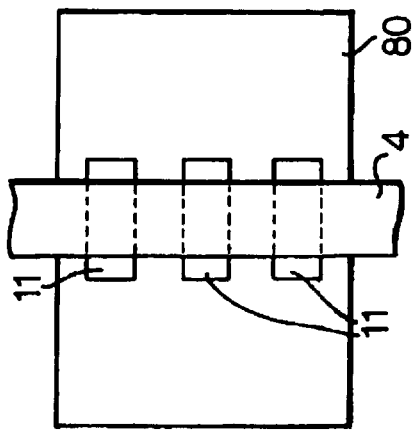

METHOD OF MANUFACTURING A SECURITY ITEM

FIELD OF THE INVENTION

The invention relates to methods for manufacturing a security item which include forming a polymer plastics substrate.

DESCRIPTION OF THE PRIOR ART

Conventionally, security items having a polymer plastics substrate have been laminated structures secured against fraudulent reproduction and counterfeiting using suitable security print and the like. This is an expensive process. WO-A-99/46133 describes a coextrusion process and in one option a security thread is incorporated into the coextruded layers. However, this is not always satisfactory since the thread will be positioned on the surface of the substrate and can be removed or altered.

SUMMARY OF THE INVENTION

In accordance with one aspect of the present invention, a method of manufacturing a security item comprises forming a polymer plastics substrate and, during the forming process, introducing a security thread into the substrate, and causing the security thread to be embedded to different depths in the substrate so as to generate a windowed effect.

We have found surprisingly that it is possible securely to embed a security thread in the substrate so as to generate a windowed effect without having to rely on conventional lamination. This is very difficult to counterfeit or fraudulently reproduce and until now has only been attempted with paper substrates.

There are a variety of ways in which the method can be implemented. In one approach, the forming process comprises extrusion through an extrusion die. In this case, the security thread may be introduced downstream of the extrusion die, while the substrate is still molten, the method further comprising selectively varying the depth of the thread in the substrate.

Conveniently, when the thread is pushed into the substrate, the security thread is preformed with an undulation generally corresponding with the pushing positions. This reduces the risk of breakage of the thread during the pushing process.

Alternatively, the thread may be fed through the extrusion die and oscillated in a direction with a component orthogonal to the substrate thickness. This will be more difficult to achieve than the process outlined above.

Further, in accordance with a second aspect of the present invention, we provide an elastomeric security thread.

In a second approach, the forming process comprises casting in which the plastics polymer is supplied onto a release substrate through a nozzle, a thread also being supplied, typically also, but not necessarily, through the nozzle.

In one example, the thread is oscillated in a direction with a component orthogonal to the substrate thickness.

By suitably controlling the manner in which the thread is embedded, the thread can be selectively exposed on only one side of the substrate or on both sides.

In other examples, the release substrate has recesses corresponding to the window effect, the security thread being guided over the recesses.

This is more straightforward than oscillating the thread and allows the windows to be more accurately defined.

In order to ensure that the thread is securely held on the release substrate, preferably the substrate is perforated, the method further comprising applying a vacuum to the perforations in the substrate to hold the thread on the substrate.

In some cases, the release substrate comprises an elongate web or even a plate but in preferred examples it comprises an endless belt.

The advantages of the invention are that there is no need to laminate plastics materials to achieve the embedded thread nor any need to use adhesives. In many cases, a constant thickness can be achieved across the resultant web enabling products to be produced in roll format. Furthermore, the resulting product is difficult to counterfeit and this reduces the need to provide substantial security printing on the substrate.

Although the invention has been described above in connection with the supply of a single thread, it will be readily apparent that more than one thread could be embedded, typically laterally spaced across the release substrate.

Following production of the security item, personalized indicia can be provided in a conventional manner, typically using a dye sublimation technique. This is described in more detail in WO-A-99/46133.

The invention is particularly suited for manufacturing items with thicknesses of 50–800 microns using the casting process and 30–200 $\mu$m using extrusion.

The invention is generally applicable to banknotes, cheques (whether bank or travellers), bonds, share certificates, licences, some types of identity cards, smart cards, passports, visas tickets, passbooks, vouchers, deeds, tamper revealing seals and labels, brand authenticity labels and the like. Indeed, any security item based on a plastics material could be implemented using this invention. Both flexible and rigid plastics substrates can be used, depending on the intended application.

BRIEF DESCRIPTION OF THE DRAWINGS

Some examples of methods according to the invention will now be described with reference to the accompanying drawings, in which:

FIG. 2A illustrates a second example of an extrusion process;

FIG. 2B is a plan of part of the chilled roller in FIG. 2A;

FIG. 8A illustrates a second example of a casting process; and,

FIG. 8B is a plan of part of the release substrate shown in FIG. 8A.

DESCRIPTION OF THE EMBODIMENTS

Figure 1:
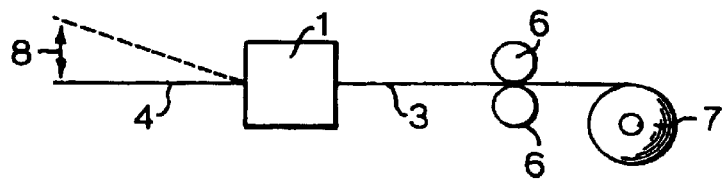
FIG. 1 illustrates a first example of an extrusion process.

In the process shown in FIG. 1, a plastics polymer 3 is extruded through an extrusion die 1. A non-metallised, polyester security thread 4 is fed through the extrusion die 1 so that it is automatically embedded within the extruded material 3. The extrusion is then fed to cooling rollers 6 and wound onto a take-up roll 7.

In order to achieve a windowed effect, the thread 4 is oscillated in a vertical direction, i.e. orthogonal to the thickness of the substrate, as shown at 8 so that the thread will periodically be exposed above the surface of the polymer material and then embedded within it. In this way, the windowed effect can be achieved when viewed from above.

FIGS. 2A and 2B illustrate an alternative extrusion process. For simplicity, those elements of FIG. 2A which correspond to similar elements in FIG. 1 are given the same reference numerals and will not be further described. In this case, the thread 4 is supplied from a supply roll 4' to the extruded polymer 3 downstream of the extrusion die 1. The polymer will still be molten at this point. To achieve the windowed effect, the thread is heated at 2 to bring it to a similar temperature to the film 3 and then supplied to the extruded plastics 3 at a point 9 at which it contacts rotating, rollers 6A, 6B. The lower roller 6B is chilled and carries a relief pattern defined by projections 11. As the rollers 6A,6B rotate, projections on the rollers periodically contact the thread 4 and push it into the molten plastics 3. In other regions, the thread 4 will lie on the surface of the molten plastics 3. In this way, the windowed effect is achieved. By bringing the thread 4 into contact with the extruded film at 9, the majority of the stretching is complete and so less stretchable threads can be used than in the FIG. 1 example.

Figure 3:
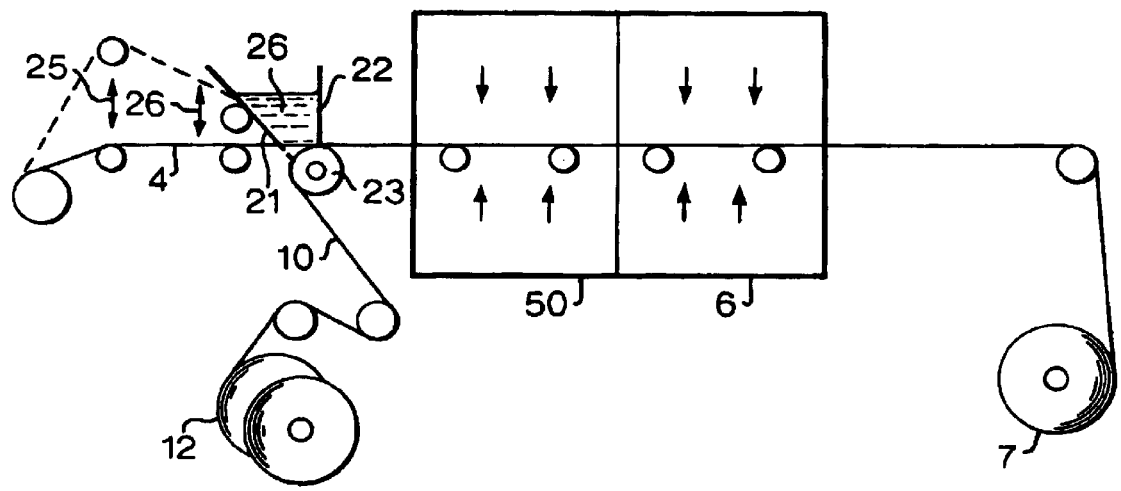
FIG. 3 illustrates a first example of a casting process, FIG. 3A being a schematic cross-section through the cured substrate.

FIG. 3 illustrates an alternative, casting process. In this process, plastics polymer is provided in a reservoir 20 defined between a back plate 21 and a knife plate 22, the knife plate 22 defining with an opposed roller 23 a nozzle 24 (FIG. 4) through which polymer can exit, being carried on a release substrate 10 such as silizonized paper supplied from a roll 12.

The cast material is then heated at 50 and cooled at 6 before being wound up on to take-up roll 7.

As the thread 4 is fed through the nozzle 24, it is oscillated in a vertical direction as shown at 25,26.

Figure 3A:

The resultant product is shown schematically in cross-section in FIG. 3A where it will be seen that the thread 4 exhibits a vertically undulating path in the cured polymer 27 thus generating the desired windowed effect.

Figure 4:
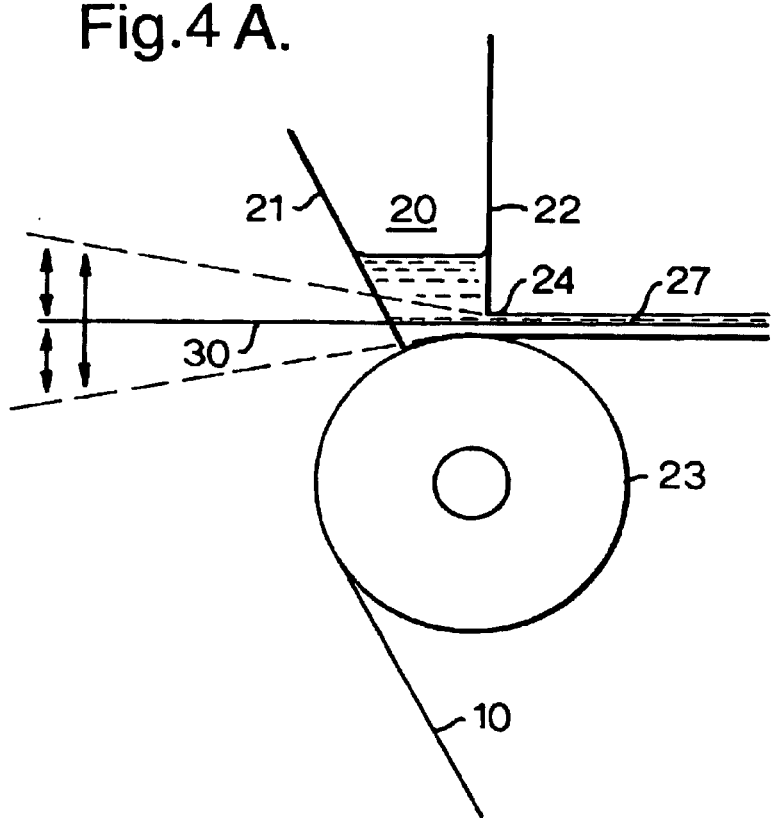
FIGS. 4A–4C illustrate three different methods for oscillating the thread in the FIG. 3 example.
Figure 4:
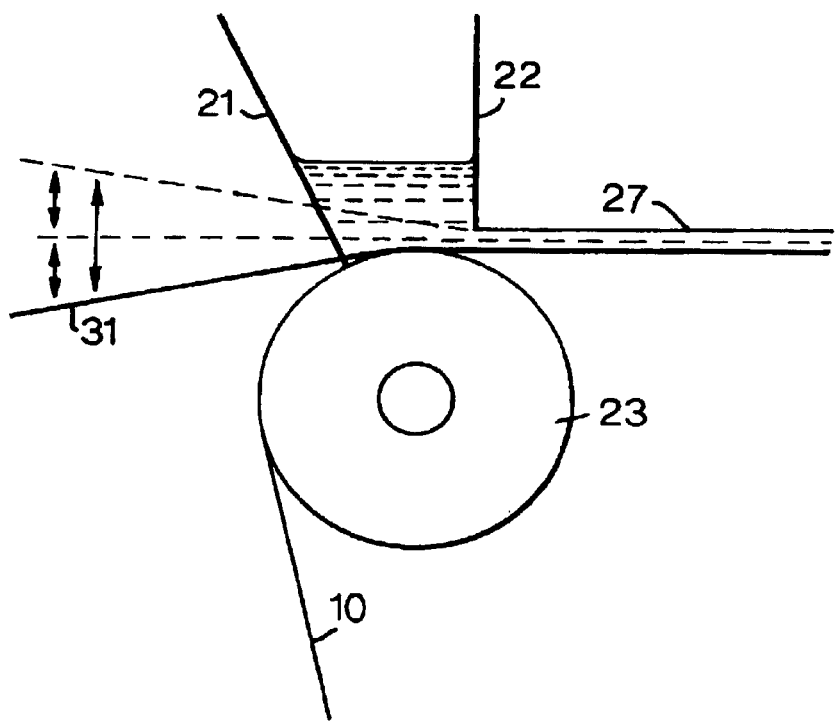

The oscillation of the thread is shown in more detail in FIG. 4. When the thread is at its nominal central position 30 (FIG. 4A), it will pass centrally through the nozzle 24 and be fully embedded in the plastics polymer 27.

When the thread is oscillated to its lower position 31 (FIG. 4B), it will contact the release substrate 10 and thus will be exposed on the bottom surface of the plastics polymer 27.

When the thread is oscillated to its uppermost position 32 (FIG. 4C), it will contact the underside of the knife plate 22 and be exposed on the upper surface of the plastics polymer 27.

If therefore the thread is oscillated between positions i and iii in FIG. 4C, the windowed effect will be visible from both sides of the resultant substrate. Alternatively, the thread can he oscillated between positions i and ii or between ii and iii to achieve the windowed effect on just one side of the substrate.

Examples of suitable plastics polymer materials include thermoplastics and thermoset polymers such as polyvinylchloride (PVC), polyethylene terephthalate (PET), polypropylene terephthalate (PPT), polyurethane (PU), polybutylene terephthalate (PBT), polypropylene (PP) and polyethylene (PE).

Figure 5:
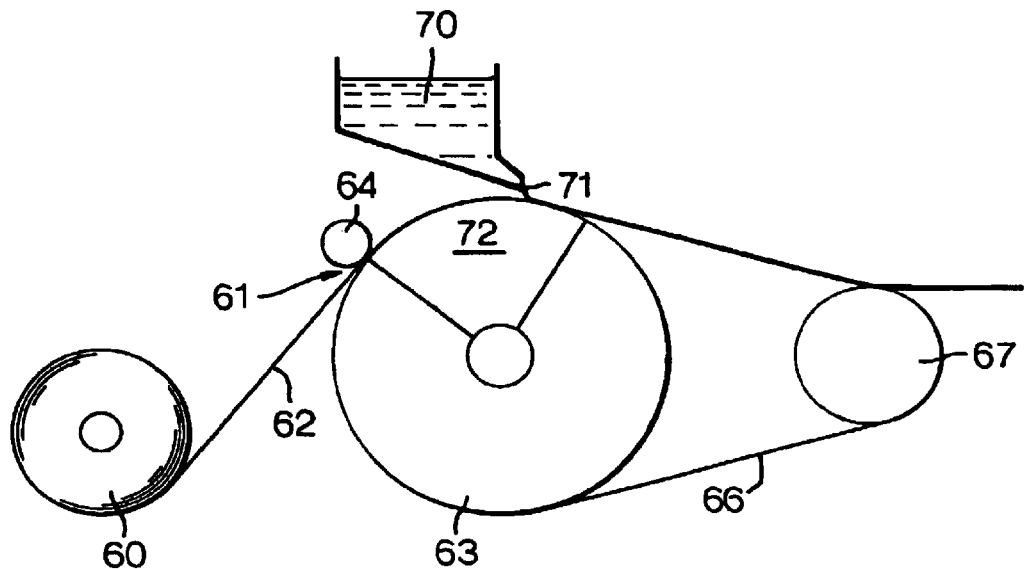
FIGS. 5 and 6 illustrate a third example of an extrusion process.
Figure 6:
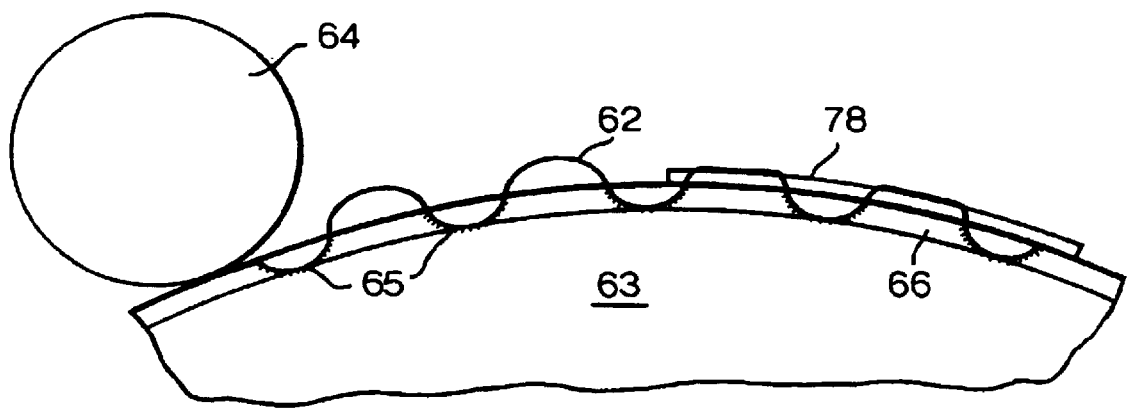

In the FIG. 2 example, the thread 4 is pushed into the polymer film 9 by the rollers 6'. There is a risk that with certain threads, this could cause breakage of the thread. To overcome this, the system shown in FIGS. 5 and 6 could be used. In this case, a security thread 62 is stored on a bobbin 60 and fed to a nip 61 between a support belt 66 and a pinch roller 64. The support belt 66 is formed with a series of vacuum slots 65 substantially equally spaced apart and having perforations as shown in FIG. 6. The support belt 66 is slidably mounted about the casting roll 63 and is drivingly entrained about a drive roller 67.

As in the FIG. 2 example, polymer 70 is extruded through a nozzle 71 onto the support belt 66.

The stationary casting roll 63 has a cut-away portion 72 which communicates with a vacuum source (not shown).

Figure 7A:
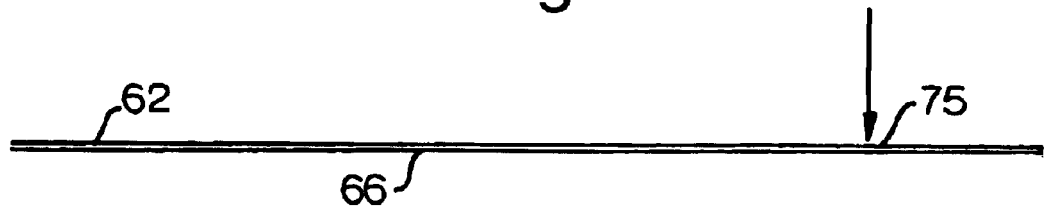
FIGS. 7A–7C illustrate the steps used in the FIGS. 5 and 6 example to form a loop.
Figure 7B:
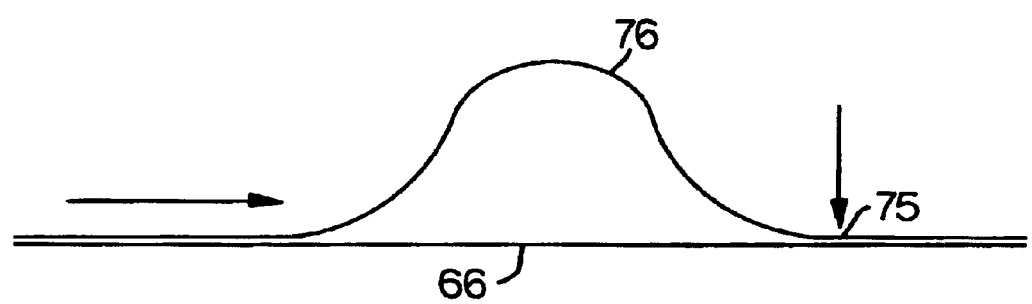
Figure 7C:
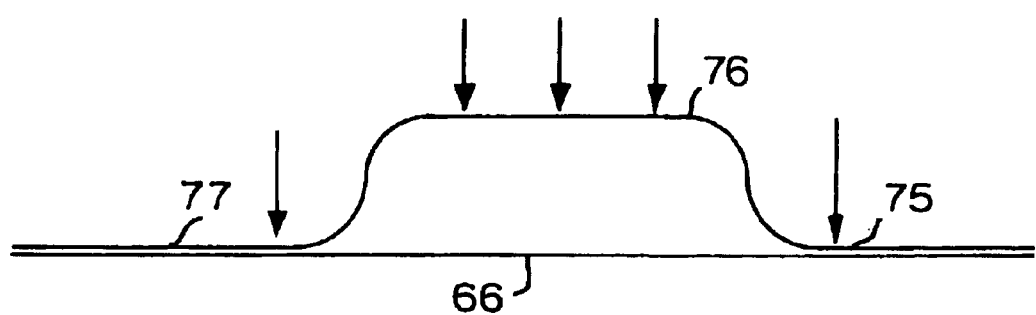

In use, the support belt 66 is rotated about the casting roll 63 in a clockwise direction while the pinch roller 64 is rotated in an anti-clockwise direction at a faster peripheral rate so as to draw the security thread 62 off the bobbin 60. This enables the security thread to be preformed into the corrugated or undulating form shown in FIG. 6. The principle behind this is illustrated in FIGS. 7A–7C. Initially, a leading end of the thread is fixed to the support belt 66 as shown at 75 (FIG. 7A) and this fixing is achieved by virtue of the vacuum applied through an adjacent recess 65. With the leading end of the thread fixed, a relatively fast rotation of the pinch roller 64 pushes a length of the thread 62 forward so as to form a loop 76 (FIG. 7B) and, due to movement of the support belt 66, the next recess 65 is exposed to the vacuum thus fixing the thread 62 at a position 77.

With the thread 62 preformed into a corrugated profile, it passes beneath the nozzle 71 so that a layer of molten polymer 78 is extruded onto the support belt 66. Cooling is provided from above the thread 62 (not shown).

The extruded polymer 78 with the embedded thread 62 is then conveyed towards the drive roller 67 from where it is separated in a conventional manner from the support belt 66 for subsequent downstream processing.

FIG. 8A illustrates an alternative casting process similar to the examples of FIGS. 2 and 3. Those components which are the same as in FIG. 3 have been given the same reference numbers and will not be described further. In this case, in contrast to FIG. 3, the release substrate now constitutes an endless belt 80 entrained about rollers 23,81, one of which is driven by a motor (not shown).

The endless belt 80 has a number of projections 11 defining a windowed profile, an example of which is shown in FIG. 8B. This is similar to FIG. 2 and avoids the need to oscillate the thread as shown in FIGS. 3 and 4. The thread 4 is supplied from a bobbin 85.

The belt 80 is typically made of stainless steel or a plastics material such as Kevlar and is treated so as to have release properties. For example, it may be siliconised or provided with a PTFE coating.

In use, the thread 4 is fed to the nozzle 24 defined by the knife plate 22 and roller 23 in alignment with the projections 11. Polymer is supplied to the belt through the nozzle 24.

After heating 50 and cooling 6, the finished cast product is separated from the belt 80 and wound onto the take-up roll 7.

We claim:

1. A method of manufacturing a security item, the method comprising forming a polymer plastics substrate and, during the forming process, introducing a security thread into the substrate, and causing the security thread to be embedded to different depths in the substrate so as to generate a windowed effect in which the security thread is alternately exposed from and covered by a surface of the substrate.

2. The method according to claim 1, wherein the forming process includes extrusion through an extrusion die.

3. The method according to claim 2, wherein the security thread is introduced into the polymer plastics substrate downstream of the extrusion die, while the substrate is still molten.

4. The method according to claim 3, further comprising selectively pushing the thread into the substrate.

5. The method according to claim 4, wherein the security thread is preformed with an undulation generally corresponding with the pushing positions.

6. The method according to claim 5, wherein the thread is preformed by holding the thread on a surface formed with recesses having perforated bases through which a vacuum is applied.

7. The method according to claim 2, wherein the security thread is fed through the extrusion die and oscillated in a direction with a component orthogonal to the substrate thickness.

8. The method according to claim 1, wherein the forming process includes casting in which the plastics polymer is supplied onto a release substrate through a nozzle.

9. The method according to claim 8, wherein the thread is also supplied through the nozzle.

10. The method according to claim 8, wherein the thread is oscillated in a direction with a component orthogonal to the substrate thickness.

11. The method according to claim 8, wherein the release substrate has recesses corresponding to the window effect, the security thread being guided over the recesses.

12. The method according to claim 8, wherein the substrate is perforated, the method further comprising applying a vacuum to the perforations in the substrate to hold the thread on the substrate.

13. The method according to claim 8, wherein the release substrate is an endless belt.

14. The method according claim 1, wherein the plastics polymer material is one of PVC, PET, PPT, PU, PBT, PP and PE.

15. The method according to claim 1, wherein the security thread is made of substantially the same material as the substrate.

* * * * *